United States Patent
Kao et al.

(10) Patent No.: US 7,499,955 B2
(45) Date of Patent: Mar. 3, 2009

(54) SYSTEM AND METHOD FOR UNDOING APPLICATION ACTIONS USING INVERSE ACTIONS WITH ATOMIC ROLLBACK

(75) Inventors: Wayne Kao, Saratoga, CA (US); Ashley L. Morgan, Santa Clara, CA (US); Robert L. C. Parker, Burlingame, CA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 11/094,913

(22) Filed: Mar. 30, 2005

(65) Prior Publication Data

US 2006/0230311 A1    Oct. 12, 2006

(51) Int. Cl.
  *G06F 12/00* (2006.01)
(52) U.S. Cl. .................. 707/202; 707/200; 714/15; 714/16; 711/151
(58) Field of Classification Search .............. None
  See application file for complete search history.

(56) References Cited

U.S. PATENT DOCUMENTS

| | | | | |
|---|---|---|---|---|
| 4,498,145 A | * | 2/1985 | Baker et al. | 707/202 |
| 5,850,507 A | * | 12/1998 | Ngai et al. | 714/16 |
| 6,493,826 B1 | * | 12/2002 | Schofield et al. | 726/22 |
| 6,618,851 B1 | * | 9/2003 | Zundel et al. | 717/103 |

* cited by examiner

*Primary Examiner*—Christian P. Chace
*Assistant Examiner*—Christyann R Pulliam
(74) *Attorney, Agent, or Firm*—Merchant & Gould; Ryan T. Grace (57) ABSTRACT

An undo operation is executed by an application by performing the inverse actions of the do operation to which the undo operation relates. Previous designs simply swapped memory to execute an undo operation according to code that was entirely dissimilar to the code of the do operation. The dissimilarity of the code caused debugging such operations to be difficult. Using the inverse action to undo an action results in the similar code for the do, undo, and redo operations. Also, undo atoms are logged for do, undo, and redo operations so that any exceptions thrown during an operation allows the application to return to a previous, consistent state by operating on the undo atoms.

13 Claims, 7 Drawing Sheets

SYSTEM AND METHOD FOR UNDOING APPLICATION ACTIONS USING INVERSE ACTIONS WITH ATOMIC ROLLBACK

BACKGROUND OF THE INVENTION

User error handling is performed differently across different software applications, suites, and platforms. Depending on the error that has occurred, the error may be handled differently by both the user and the application. Sometimes, an action is perceived to be a mistake by the user when the action is not considered an error by the application. For example, a user may type a word or phrase into a word processor application, or insert an object into a drawing application. These actions are not considered errors by the application, but may be considered as mistakes by the user. Because of these inadvertent errors or decision changes by the user, many applications and other software suites provide an "undo" method that allows a user to undo one or more of their previously performed actions.

One previous undo method stores states and references to objects before and during a "do" operation (e.g., write, insert, etc.) so that the old state may be restored at undo time. As a do operation is performed, "undo atoms" are stored in a log. Undo atoms corresponding to a do operation create a record of memory swaps that return the state of an application to the state existing before the do operation commenced. Correspondingly, the undo atoms may also be used to transfer the state of the application to the state existing before an undo operation commenced. Stated differently, each undo atom merely swaps memory so that the state of the application is returned to the state that was present before the do or undo operation. The state of the application is changed rather than another operation being performed within the application. This method has an advantage in that memory swaps do not throw an exception since no new memory is allocated. Throwing an exception involves identifying actions that can result in unexpected or undesired behavior and preventing it from happening. Throwing the exception also lets the entity that is requesting that behavior know about the avoided undesired behavior. The memory swaps associated with walking through the undo atoms have been a dependable method because it avoids the problem of throwing exceptions.

The disadvantages of such an undo method is that errors still may occur, and since the memory swap code is so different than the code used in the original "do" operation, these errors may be extremely difficult to debug. Also, restoring state is a viable option only for a limited number of operations. As more and more changes are made, the probability of not maintaining integrity of a state or returning to the correct state increases.

SUMMARY OF THE INVENTION

Embodiments of the present invention are related to a system and method for undoing application actions using inverse actions with atomic rollback. The present invention solves for the limitations of previous methods by making the code of do, undo, and redo operations similar, allowing multiple operations to be performed, and allowing for multi-user editing scenarios. The present invention executes an undo operation (also referred to herein as an "undo") by executing an operation that is the opposite of the do operation (also referred to herein as a "do"). At the same time, the present invention records a "duo" corresponding to a Do/Undo Object. A duo corresponds to an atomic unit that is implemented by a platform or application in order to do, undo, or redo an operation. One or more duos are executed when a user executes a do or undo transaction. Each duo may include one or more undo atoms. The undo atoms, organized in a duo chain, are usable to rollback the application to a consistent state if an exception occurs during a do, undo, or redo transaction. The undo atoms used for atomic rollback of the state are not used in the normal course of the do, undo, and redo transactions. Instead, the present invention limits the use of the undo atoms to situations when an exception is thrown. If an exception is thrown, the undo atoms are used to rollback the state of the application to a prior known, consistent state. Each time that the action corresponding to a duo succeeds without throwing, the logged undo atoms are discarded.

In accordance with one aspect of the present invention, a method for undoing a transaction associated with an operation of an application is provided. When the transaction is initiated a duo is added to the transaction, wherein the duo corresponds to an action of the operation, and a first undo atom is logged corresponding to the duo. If an exception is encountered, the state associated with the application is atomically rolled back to a state existing prior to execution of the operation. When the transaction is committed, the first undo atom is cleared from the duo, the duo is inserted into a duo chain, and the undo entry is passed to an undo stack. When undoing the transaction, the undo entry is retrieved from the undo stack and the duo chain is walked in reverse order to call a function that performs an inverse action of the action of the operation corresponding to each duo in the duo chain. A second undo atom is logged corresponding to each duo in the duo chain. If an exception is encountered while the duo chain is walked, the state associated with the application is rolled back to a state existing prior to undoing the transaction.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
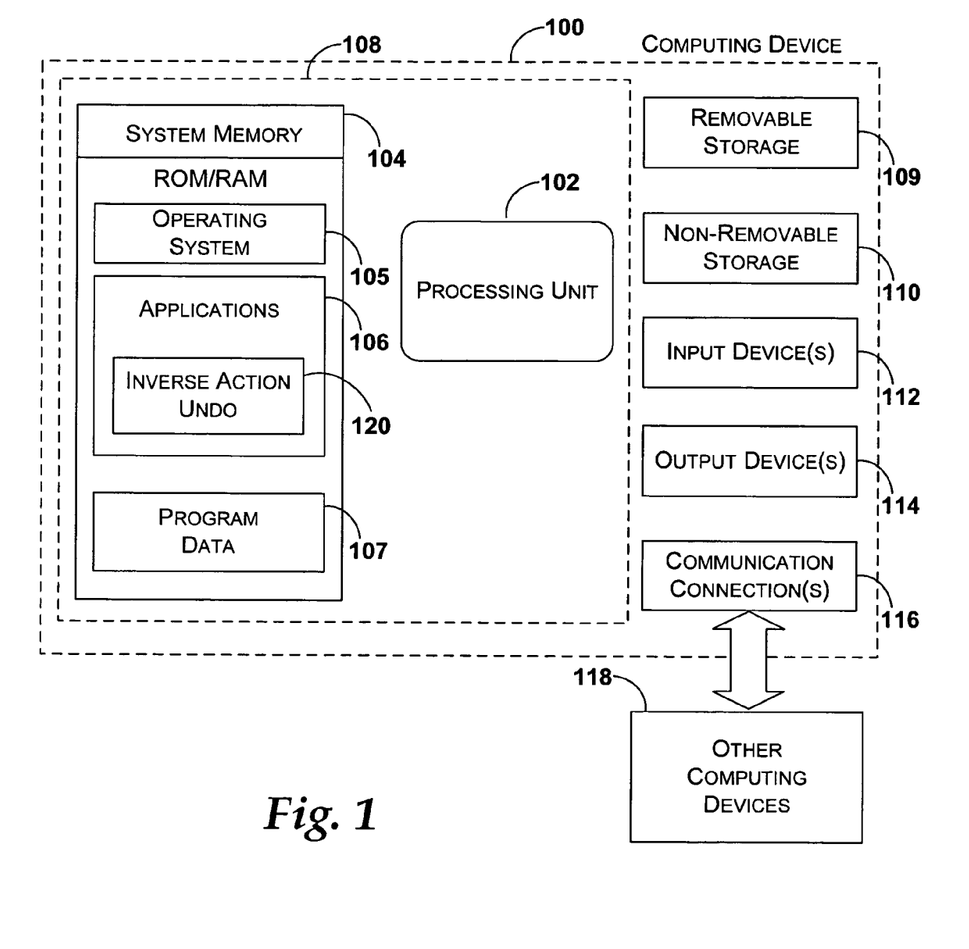
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes an inverse action undo application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Undo with Atomic Rollback

The present invention is related to an inverse actions undo model that uses the inverse of an action to undo the action. This model provides a significant departure from previous undo models that would undo actions by swapping memory. The present invention provides the advantage of using similar code for the undo that was used in the original action, allowing errors in the code to be debugged much more easily. Also, the undo of the present invention may be used for multiple changes that have occurred, whereas previous undo models may have more trouble tracking state through multiple changes. Furthermore, the present invention is able to track and undo actions for multi-user editing scenarios, an ability not available with previous undo methods.

Throughout the following description and the figures, similar components and objects are similarly labeled. In addition, selected components and objects repeated in a figure are not labeled repeatedly for improved readability of the figures.

Figure 2:
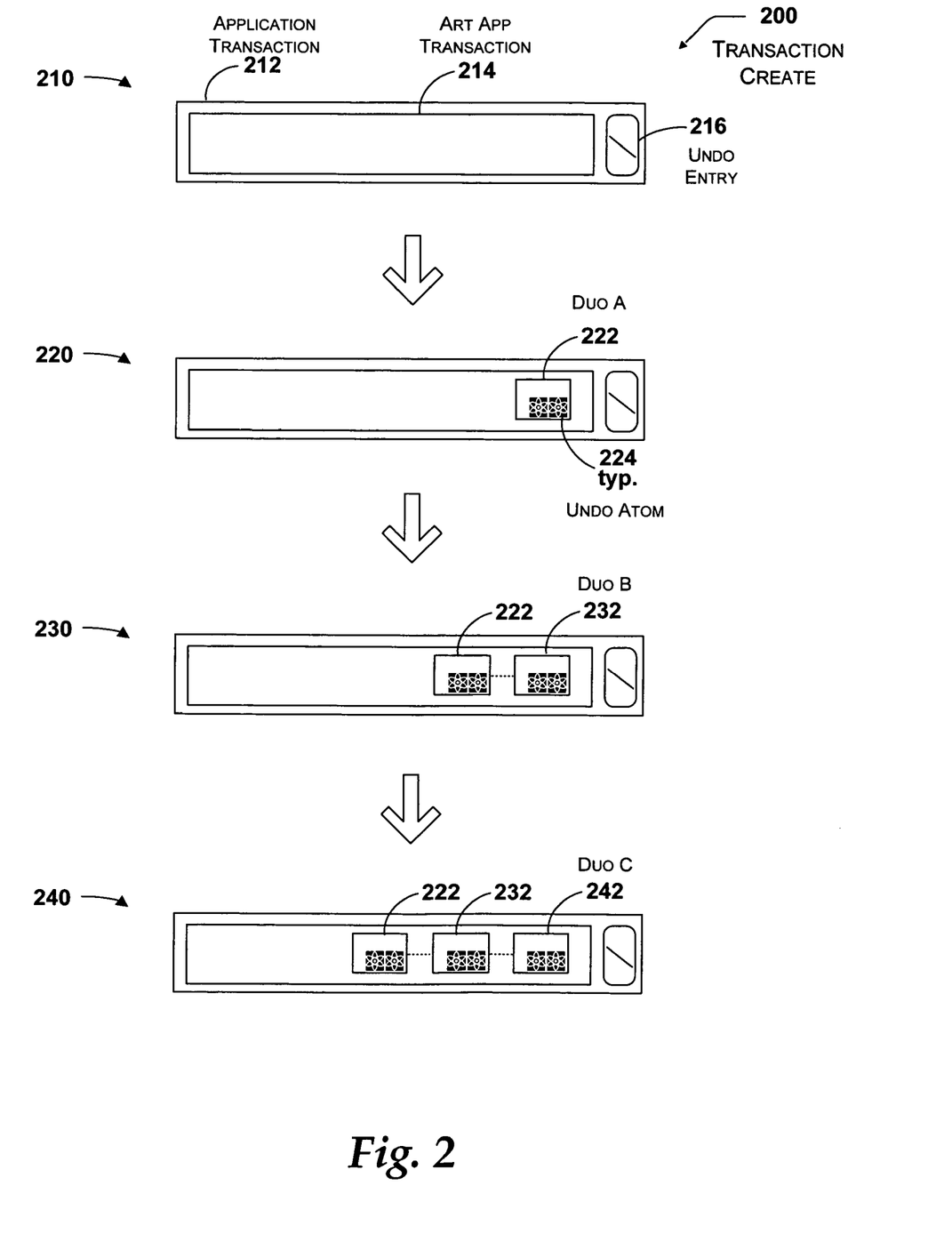
FIG. 2 illustrates a functional block diagram for an example of initializing a transaction in accordance with the present invention.
Figure 3:
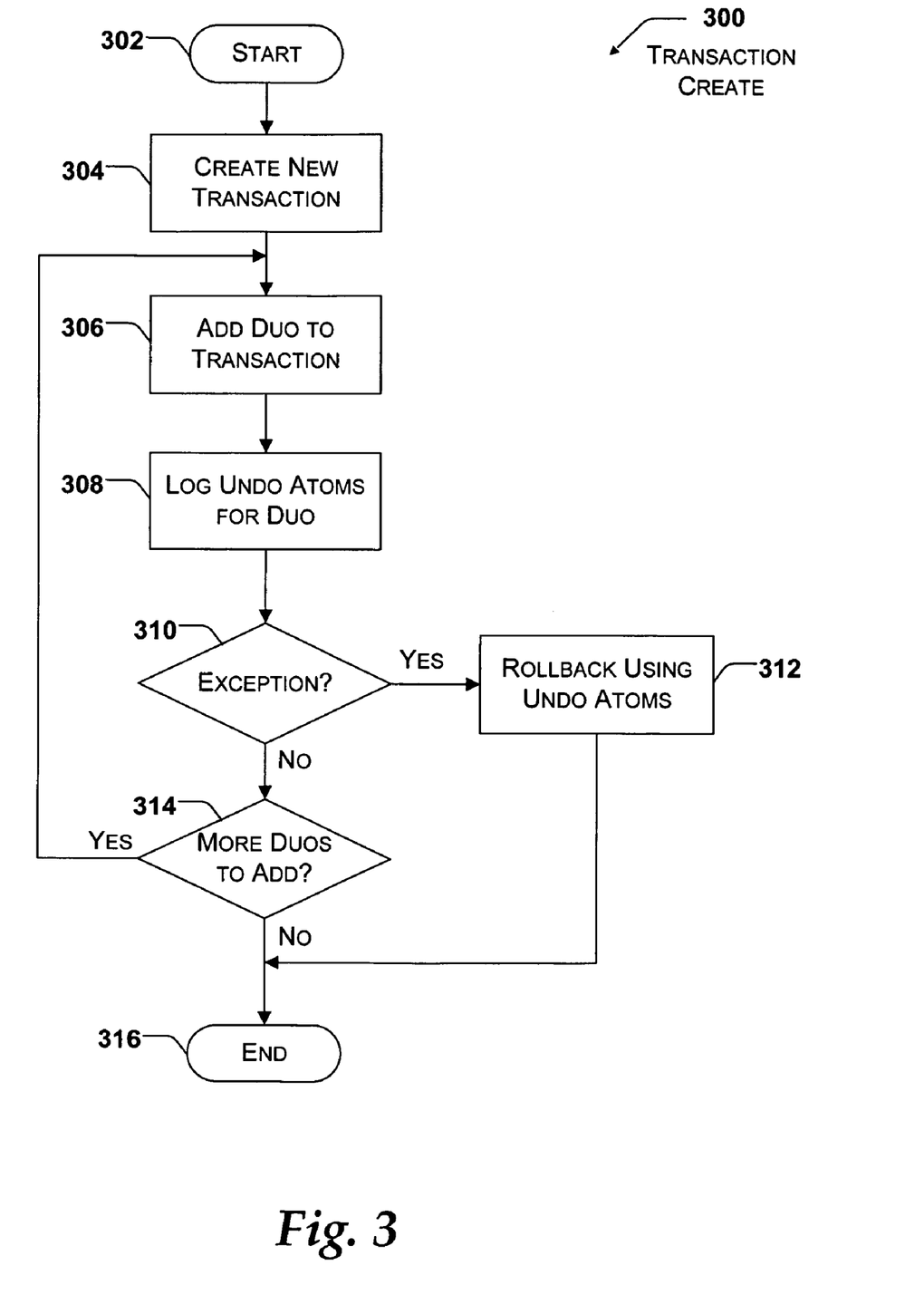
FIG. 3 illustrates a logical flow diagram for an example process of initializing a transaction in accordance with the present invention.

FIGS. 2 and 3 illustrate a functional block diagram and a logical flow diagram for an example and process of initializing a transaction in accordance with the present invention. In one embodiment, the transaction create example 200 shown in FIG. 2 corresponds to an art application where a command is created to insert a blue rectangle shape into a drawing in response to a user selection. When the user makes the selection to insert the shape, the drawing is created, a rectangle shape is added to the drawing, and the rectangle's fill color is set to blue. These three actions may be considered a single do operation. For the do operation, code executes when the operation is executed that initiates an application transaction as shown in FIG. 2 according to the process in FIG. 3.

Process 300 of FIG. 3 start at block 302 where a command (e.g., the command to insert a blue rectangular shape) has been generated and user has selected to execute the command. Processing continues at block 304.

At block 304 a new transaction is created corresponding to the command being executed. For the example in FIG. 2, the code creates application transaction 212 pictorially represented in view 210. Application transaction 212 includes art application transaction 214 and empty undo entry 216. In one embodiment, undo entry 216 includes an empty duo chain but is still considered an empty entry. In a further embodiment, a transaction is created by an application outside of a command. The transaction is then passed to the command during command construction. Separating the transactions from the commands allows multiple commands to share the same transaction. Once the transaction is created, processing moves to block 306.

At block 306, a duo is added to the transaction that corresponds to an action of the command. In the example of FIG. 2, duo A 222 is added to art application transaction 214 as represented in view 220. Duo A 222 represents the action of creating a drawing to insert the shape. As previously stated, a duo is a Do/Undo Object, where one or more duos represent a do, undo, or redo operation. The duo is the building block the present invention, and one or more of them executes for every undo or redo operation. In view 220, a duo (222) is added to the transaction (214) to create a drawing. While a duo is added to the transaction, processing continues to block 308.

At block 308, undo atoms corresponding to the added duo are logged while the duo is being added to the transaction. For example, in FIG. 2, two undo atoms (e.g., 224) are included in duo A 222 when the duo is added to art application transaction 214. The number of undo atoms that correspond to each duo may vary, and the present invention is not limited to the number of undo atoms shown herein. Once the duo with the logged undo atoms are added to an initiated transaction, processing continues at decision block 310.

At decision block 310, a determination is made whether the duo has caused an exception to be thrown. In one embodiment, an exception may be thrown for each duo added to a transaction. In another embodiment, an exception is only thrown when the last duo is added to the transaction (e.g., corresponding to a SetPropertyBagDuo command). If the added duo does cause an exception to be thrown, processing moves to block 312. However, if no exception is thrown, processing continues at decision block 314.

At block 312, the application is rolled back to a state that existed before the execution of the command. Code executes corresponding to the initiated transaction (e.g., a destructor) that operates on the logged undo atoms of the added duos. The code rolls the state of the application back to a state that existed before the command was called. In the example in FIG. 2, the undo atoms (e.g., 224) are operated on to roll the state of the application back to a state existing before the execution of the command to insert the blue rectangular shape. By rolling back the state of the application, the application returns to a known, good state whenever an exception is encountered. Once the atomic rollback occurs, process continues to block 316 where process 300 ends and the application continues with other tasks.

If no exception is thrown, a determination is made whether additional duos need to be added to the transaction at decision block 314. If more duos are to be added, processing returns to block 306. If the transaction instead already includes its corresponding duos, then processing advances to block 316 where process 300 ends and the application continues with other tasks. In the example of FIG. 2, two more duos (duo B 232, duo C 242) are added to art application transaction 214. Duo B 232 shown in view 230 corresponds to the action of adding the rectangular shape to the drawing created by duo A 222. Duo C 242 shown in view 240 corresponds to setting the fill color of the rectangular shape to blue. If an exception is thrown, the process corresponding to block 312 is followed to roll back the application to a known or consistent state.

Figure 4:
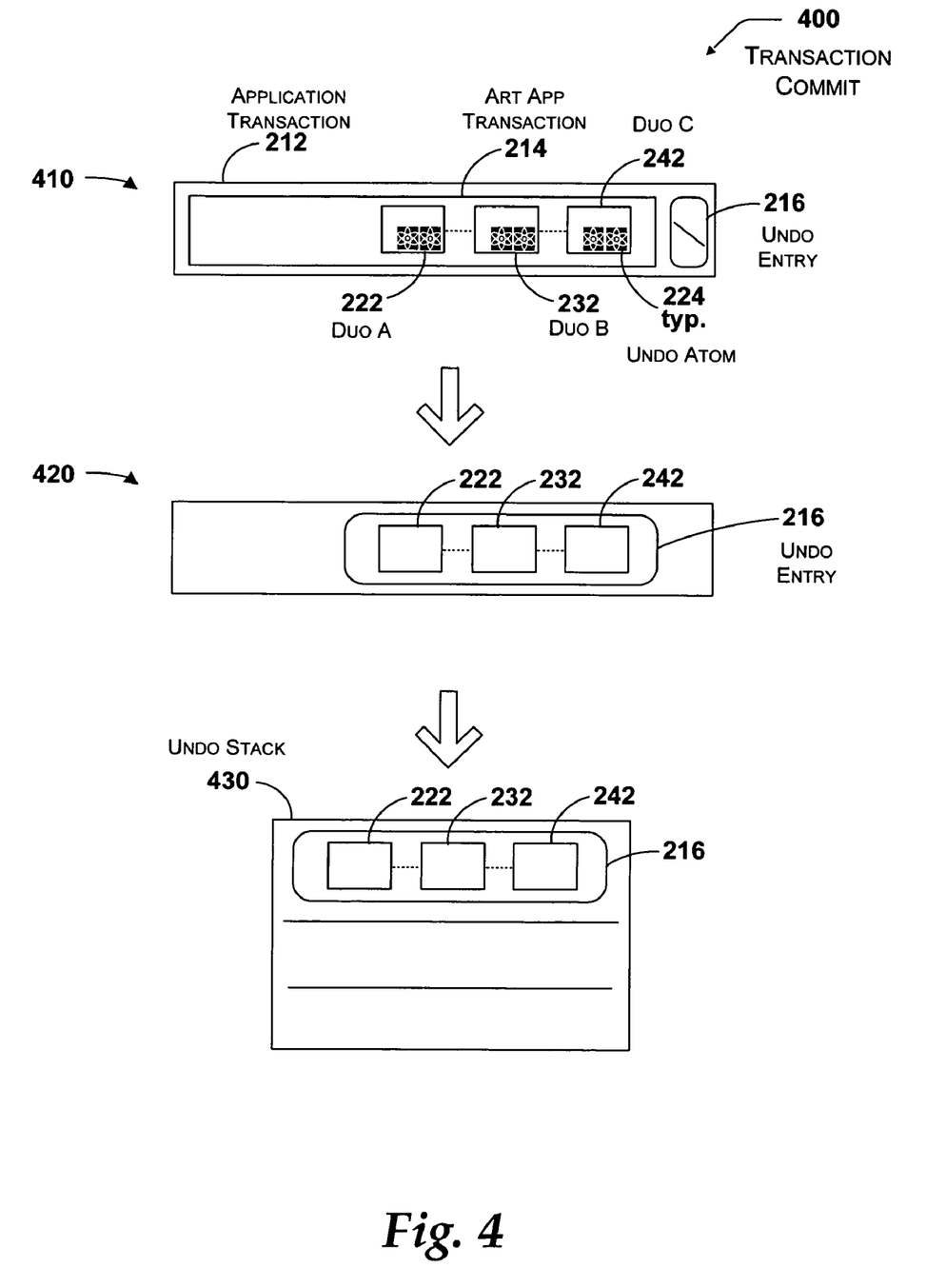
FIG. 4 illustrates a functional block diagram for an example of committing a transaction in accordance with the present invention.
Figure 5:
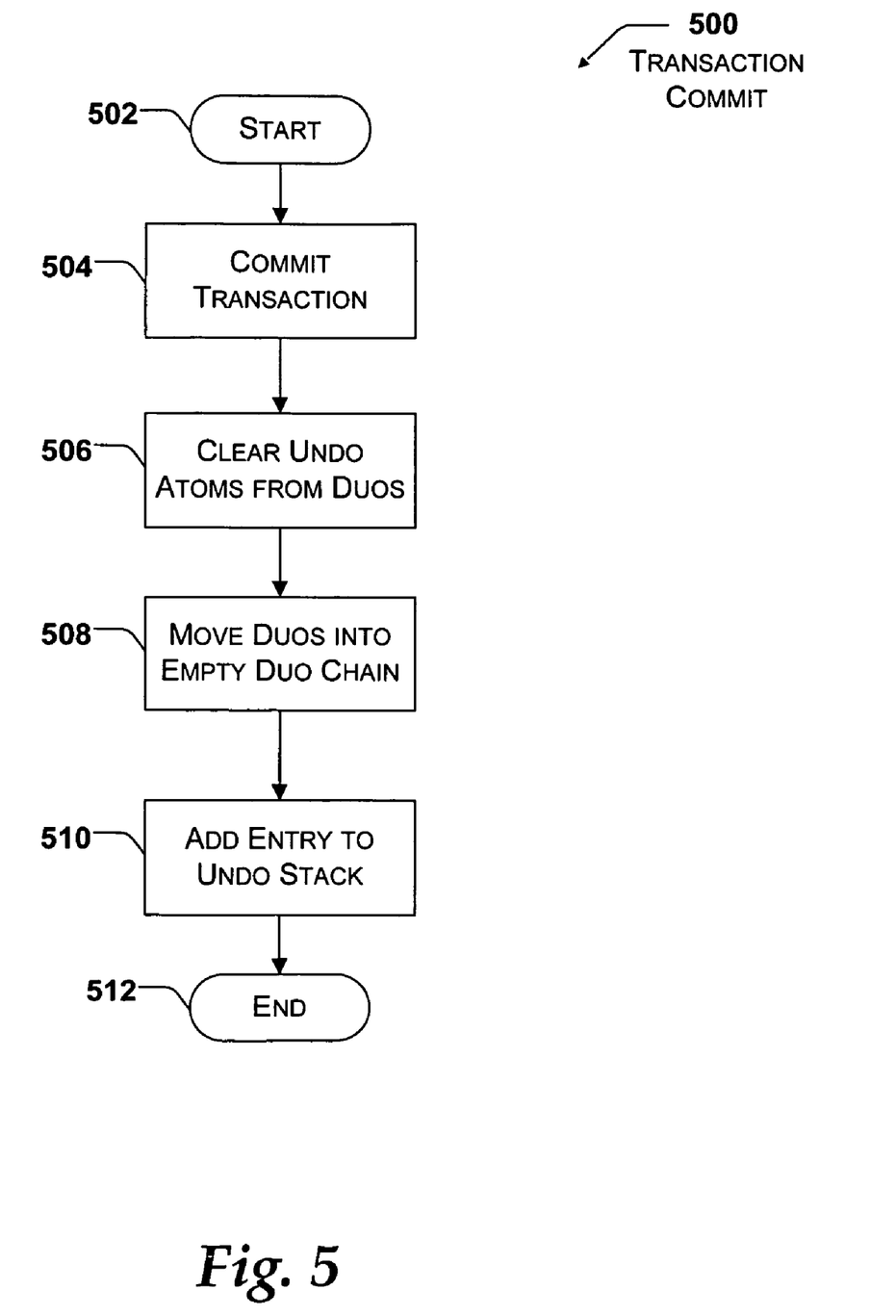
FIG. 5 illustrates a logical flow diagram for an example process of committing a transaction in accordance with the present invention.

FIGS. 4 and 5 illustrate a functional block diagram and a logical flow diagram for an example and process of committing a transaction in accordance with the present invention. In one embodiment, the transaction commit example 400 shown in FIG. 4 is a continuation of the art application example of FIG 2 where a command is created to insert a blue rectangle shape into a drawing in response to a user selection.

Process 500 of FIG. 5 starts at block 502 where a transaction has been initiated as described in the process of FIG. 3 and the example of FIG. 2. Process 500 continues at block 504.

At block 504, the initiated transaction is committed. In one embodiment, committing the transaction causes the actions associated with the transaction to be executed. In another embodiment, the actions associated with the transaction are executed as the transaction is processed rather than when the transaction is committed. Committing the transaction also results in other steps being executed associated with blocks 506 through 510 below. As the transaction is committed, processing continues at block 506.

At block 506, the undo atoms stored in association with each duo are cleared from memory. Since the undo atoms were stored for the eventuality that the transaction encountered an error, committing the transaction successfully allows these undo atoms to be erased. Examining the example of FIG. 4, view 410 shows art application transaction 214 including duos A-C (222, 232, 242) with stored undo atoms (e.g., 224). When art application transaction 214 is committed as shown in view 420, duos the undo atoms are erased from A-C (222, 232, 242) since they are no longer needed. Processing continues at block 508.

At block 508, the duos are moved to an empty duo chain included in undo entry 216. A duo chain may contain one or more duos and corresponds to the actions necessary to inverse the committed transaction. A duo chain is stored in an undo entry (e.g., 216). Once the undo atoms are stored in the duo chain, processing continues at block 510.

At block 510, the duo chain of undo entry 216 is stored as an entry of the undo stack. As shown in FIG. 4, undo entry 216 is stored as the first entry of undo stack 430. In another embodiment, when the transaction being committed is an undo transaction, the duo chain created for that transaction may be stored in a redo entry of a redo stack rather than an undo stack. Once the undo entry is stored in the undo stack, processing moves to block 512 where process 500 ends and the application continues with other tasks.

FIGS. 2 and 4 above illustrate an application transaction (212) and an art application transaction (214). Even though the examples above show the integration of these transactions for logging duos, it is understood that other configurations may be used. For example, the duos may simply be logged to a general transaction object that is common to all applications, therefore eliminating the delineation between an application transaction and an art application transaction.

Figure 6:
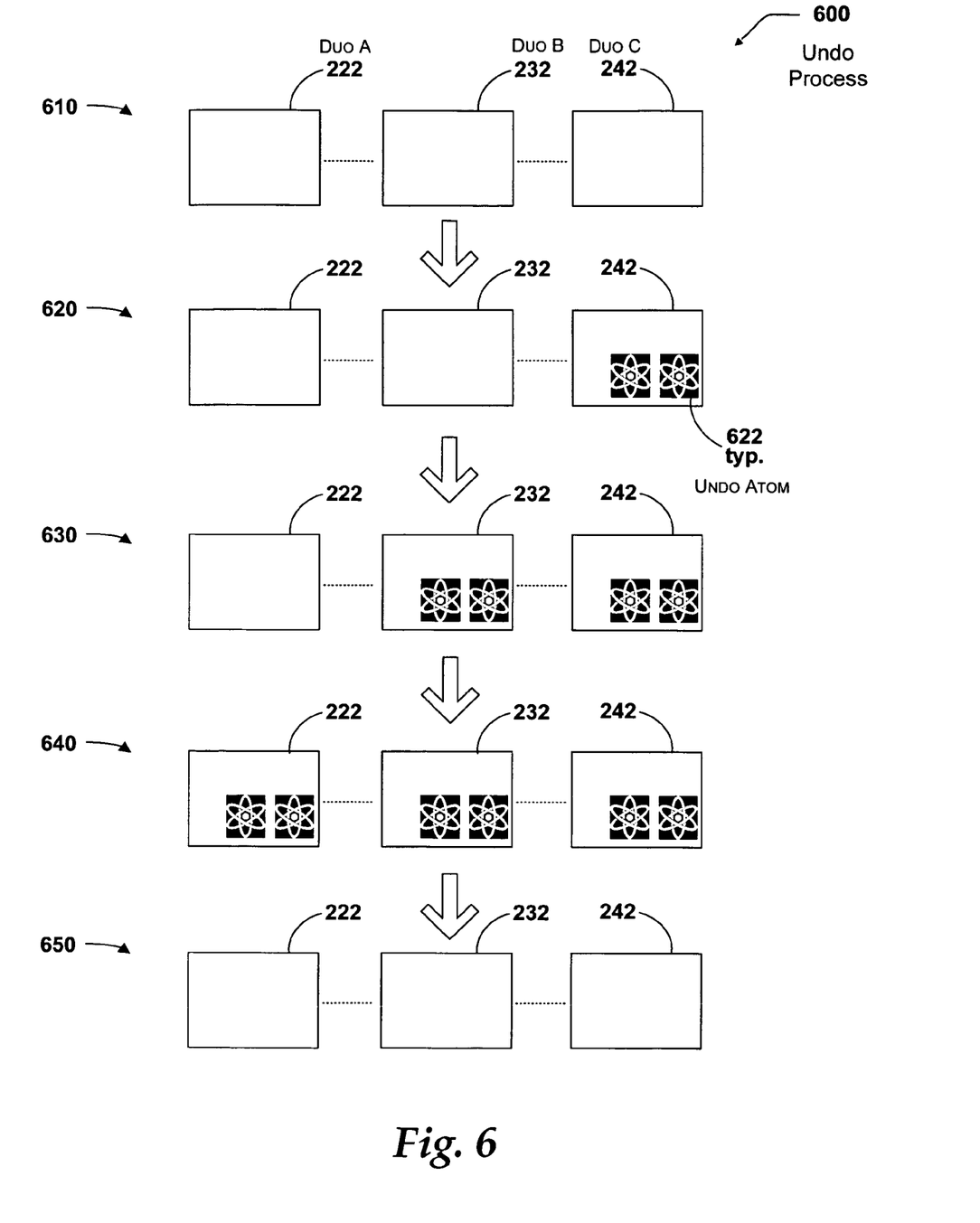
FIG. 6 illustrates a functional block diagram for an example of undoing a transaction in accordance with the present invention.
Figure 7:
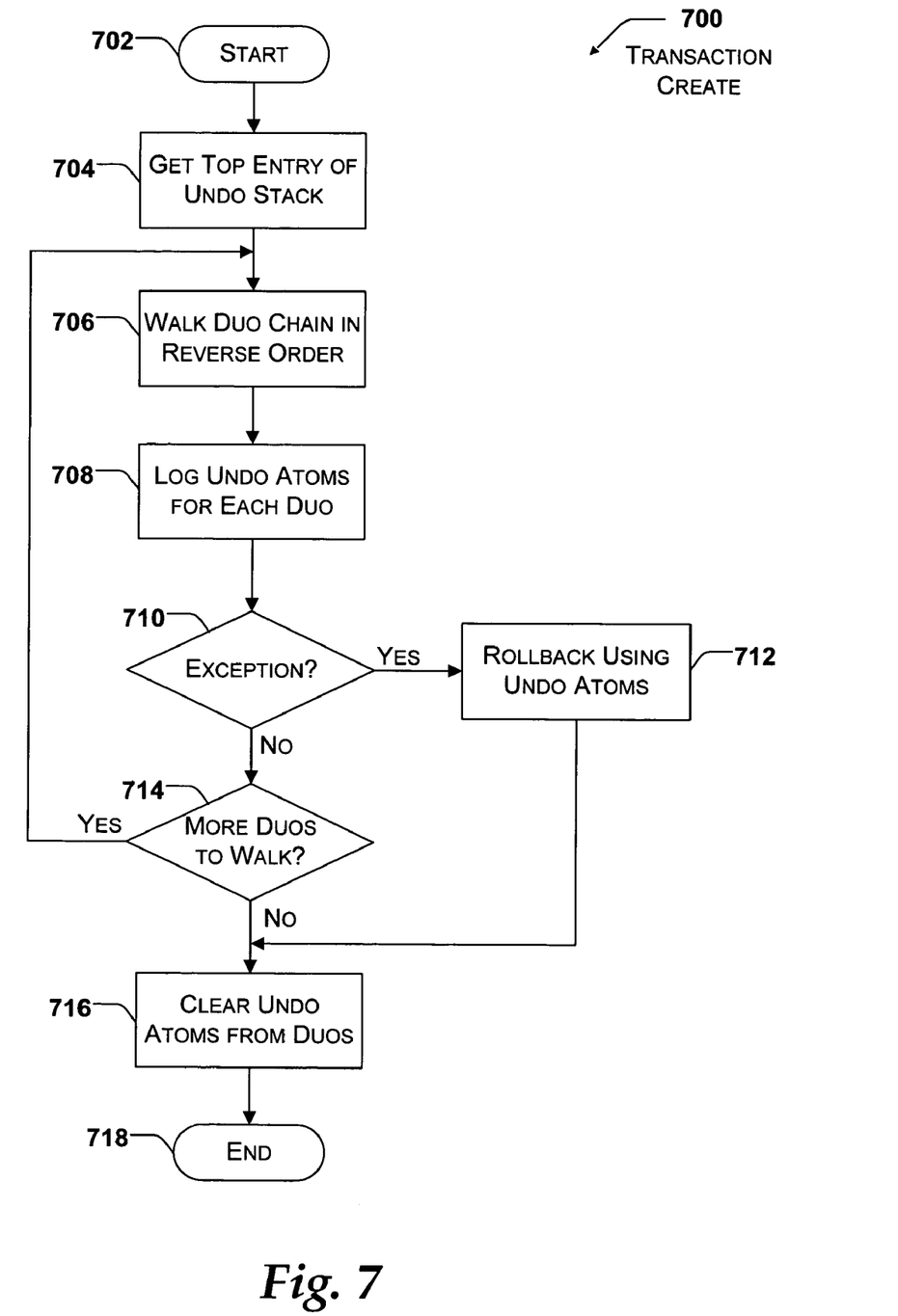
FIG. 7 illustrates a logical flow diagram for an example process of undoing a transaction in accordance with the present invention.

FIGS. 6 and 7 illustrate a functional block diagram and a logical flow diagram for an example and process of undoing a transaction in accordance with the present invention. In one embodiment, the undo process example 600 shown in FIG. 6 is a continuation of the art application example of FIGS. 2 and 4 where a command is created to insert a blue rectangle shape into a drawing in response to a user selection.

Process 700 of FIG. 7 starts at block 702 where a transaction has been committed as described in the process of FIG. 5 and the example of FIG. 4. Process 700 continues at block 704.

At block 704, the top undo entry is retrieved from the undo stack (e.g., undo stack 430 of FIG. 4). View 610 of FIG. 6 illustrates an undo chain corresponding to a retrieved entry of the undo stack. In another embodiment, when the transaction committed is an undo transaction, the entry may be retrieved from a redo stack rather than the undo stack. Processing continues at block 706.

At block 706, a walk of the undo chain retrieved is initiated in reverse order. For example, the undo chain shown in FIG. 6 is walked starting with duo C 242. Continuing the art application example, duo C 242 corresponds to the action of setting the fill color of the inserted rectangular shape to blue. A method is called that applies the inverse action within the application as the duo chain is walked. For example, the inverse action of setting the rectangular shape fill color to blue is setting the rectangular shape fill color to clear, or the original fill color of an inserted rectangular shape. As each duo is walked in the duo chain, and the method is called on each duo, processing continues at block 708.

At block 708, calling the method on each duo as the duo chain is walked in reverse also results inverse atoms being logged for each duo. Examining the example of FIG. 6, calling the inverse action method on duo C 242 as shown in view 620 logs undo atoms (e.g., 622) associated with duo C. In one embodiment, the same in method or function is used for undo and redo operations. In the art application example, the undo atoms (e.g., 622) of duo C 242 correspond to returning the fill color of the rectangular shape to blue, similar to how the undo atoms (e.g., 224) of duo C 242 for the original do operation correspond to returning the rectangular shape fill color to clear, or the original fill color of an inserted rectangular shape. As each duo (e.g., 242, 232, 222) is walked in reverse order, these undo atoms (e.g., 622) are stored with relation to each duo. Processing continues at decision block 710.

At decision block 710, a determination is made whether the duo has caused an exception to be thrown. In one embodiment, an exception may be thrown for each duo as it is walked in the duo chain. In another embodiment, an exception is only thrown when the last duo is walked and the undo transaction is committed. If the walked duo does cause an exception to be thrown, processing moves to block 712. However, if no exception is thrown, processing continues at decision block 714.

At block 712, the application is rolled back to a state that existed before the execution of the of the undo operation. Code executes corresponding to the undo transaction (e.g., a destructor) that operates on the logged undo atoms of the duos. The code rolls the state of the application back to a state that existed before the undo transaction commenced. In the example in FIG. 6, the undo atoms (e.g., 622) in the duos are operated on to roll the state of the application back to a state existing before undo transaction resulting in the application maintaining the drawing of the blue rectangular shape. By rolling back the state of the application, the application returns to a known, good state whenever an exception is encountered. Once the rollback occurs, process continues to block 716.

If no exception is thrown, a determination is made whether additional duos need to be walked in the duo chain at decision block 714. If more duos need to be walked processing returns to block 306. In the example of FIG. 6, two more duos (duo B 232, duo A 222) are also walked in reverse order. Duo B 232, shown being walked in view 630, corresponds to removing a rectangular shape from the drawing. Removing the shape is the inverse action of inserting the rectangular shape that corresponded to the original do operation. Walking duo A 222 as shown in view 640, corresponds to the inverse action of creating the drawing and instead deletes the drawing. If instead, the duo chain of the undo transaction has already been fully walked in reverse order, then processing advances to block 716.

At block 716, the undo transaction is committed and the undo atoms are cleared from the duos within the chain. Since the undo transaction was successfully executed, the undo atoms are no longer needed. As shown in FIG. 6, the duo chain in view 650 no longer includes the undo atoms (e.g., 622). In one embodiment, the undo chain is stored in an entry of a redo stack when the undo transaction is committed. In another embodiment, the undo chain replaces the entry of the undo stack when the undo transaction is committed. After the undo atoms are cleared and the undo chain stored, processing continues to block 718 where process 700 ends and the application continues with other tasks.

In a further embodiment, one or more of the processes in FIGS. 3, 5, and 7 may be repeated for additional operations. The operations may correspond to addition do operations, undo operations, or redo operations. In another embodiment, multiple transactions may undone or redone in succession according to the multiple entries on the undo and redo stacks.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for undoing a transaction, the method comprising:
   creating a DO transaction for an operation, wherein creating a DO transaction for the operation includes a computer processor:
      associating a DUO chain with the DO transaction, wherein the DUO chain indicates a sequence of operations of the DO transaction,
      logging UNDO atoms to the DUO chain, wherein the UNDO atoms indicate prior memory states for operations of the DO transaction, and
      determining whether an exception is encountered during the DO transaction, and
      performing only a memory swap operation on the DO transaction when an exception is encountered, wherein the memory swap operation includes returning to the prior memory state indicated by the logged UNDO atoms of the DUO chain;
   committing the DO transaction for the operation when the exception is not encountered, wherein committing the DO transaction for the operation includes the computer processor:
   executing the sequence of operations of the DO transaction,
   clearing the UNDO atoms from the DUO chain, and
   associating the DUO chain with a stack; and
   creating an UNDO transaction, wherein the UNDO transaction includes:
      accessing the DUO chain associated with the stack,
      walking the DUO chain in reverse order, wherein walking the DUO chain in reverse order includes by calling a method to cause an inverse action to execute to negate an action of the DO transaction,
      logging INVERSE UNDO atoms to the DUO chain, wherein the INVERSE UNDO atoms indicate a prior memory state for operations of the UNDO transaction,
      only if an exception is encountered during the walking of the DUO chain, performing a memory swap operation, wherein the memory swap operation includes returning to a prior memory state indicated by the logged INVERSE UNDO atoms of the DUO chain,
      else, continuing the walking of the DUO chain in reverse order until the UNDO transaction is complete.

2. The computer-implemented method of claim 1, wherein the DO transaction includes a write operation and the UNDO transaction includes a delete operation.

3. The computer-implemented method of claim 1, wherein the DO transaction includes at least one member of a group comprising: a do action, an undo action, and a redo action.

4. The computer-implemented method of claim 1, wherein the UNDO transaction includes at least one member of a group comprising: a do action, an undo action, and a redo action.

5. The computer-implemented method of claim 1, wherein the stack is at least one member of a group comprising: an UNDO stack and a REDO stack.

6. A computer-implemented method for undoing a transaction, the method comprising:
   accessing the DUO chain associated with a stack stored in a computer memory, wherein the DUO chain is associated with a committed DO transaction;

walking the DUO chain in reverse order by calling a method to cause an inverse action to execute to negate an action of the DO transaction;

during the walking of the DUO chain, logging INVERSE UNDO atoms to the DUO chain, wherein the INVERSE UNDO atoms indicate a prior memory state for operations of the UNDO transaction;

only if an exception is encountered during the walking of the DUO chain, performing a memory swap operation, wherein the memory swap operation includes returning to a prior memory state indicated by the logged INVERSE UNDO atoms of the DUO chain, else, continuing the walking of the DUO chain in reverse order until the UNDO transaction is complete.

7. The computer-implemented method of claim 6, wherein the DO transaction includes a committed write operation and the method includes a delete operation.

8. The computer-implemented method of claim 6, wherein the stack is at least one member of a group comprising: an UNDO stack and a REDO stack.

9. A computer-readable storage medium having computer-executable instructions for undoing a transaction, the instructions comprising:

accessing the DUO chain associated with a stack, wherein the DUO chain is associated with a committed DO transaction;

walking the DUO chain in reverse order by calling a method to cause an inverse action to execute to negate an action of the DO transaction;

during the walking of the DUO chain, logging INVERSE UNDO atoms to the DUO chain, wherein the INVERSE UNDO atoms indicate a prior memory state for operations of the UNDO transaction;

only if an exception is encountered during the walking of the DUO chain, performing a memory swap operation, wherein the memory swap operation includes returning to a prior memory state indicated by the logged INVERSE UNDO atoms of the DUO chain, else, continuing the walking of the DUO chain in reverse order until the UNDO transaction is complete.

10. The computer-readable storage medium of claim 9, wherein the DO transaction includes a committed write operation and the method includes a delete operation.

11. The computer-readable storage medium of claim 9, wherein the DO transaction includes at least one member of a group comprising: a do action, an undo action, and a redo action.

12. The computer-readable storage medium of claim 9, wherein the UNDO transaction includes at least one member of a group comprising: a do action, an undo action, and a redo action.

13. The computer-readable storage medium of claim 9, wherein the stack is at least one member of a group comprising: an UNDO stack and a REDO stack.

\* \* \* \* \*